Dec. 6, 1960  A. STAMBERA  2,963,258
WEIGHING CONTAINER, PARTICULARLY FOR AUTOMATIC SCALES
Filed July 24, 1956  2 Sheets-Sheet 1

INVENTOR:
ADOLF STAMBERA
By
Richardson, David and Naudon
Attys.

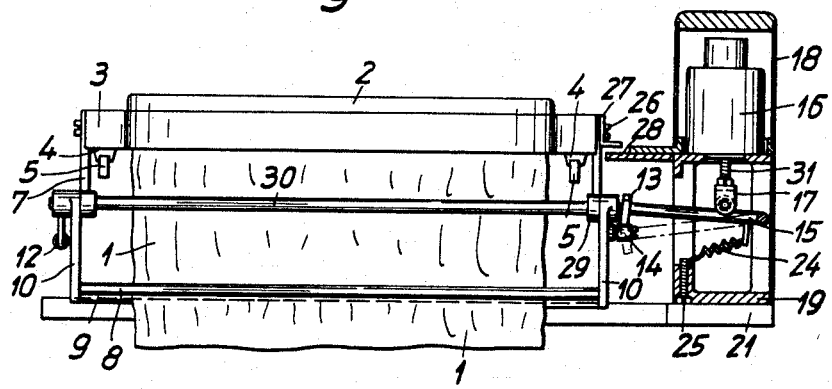
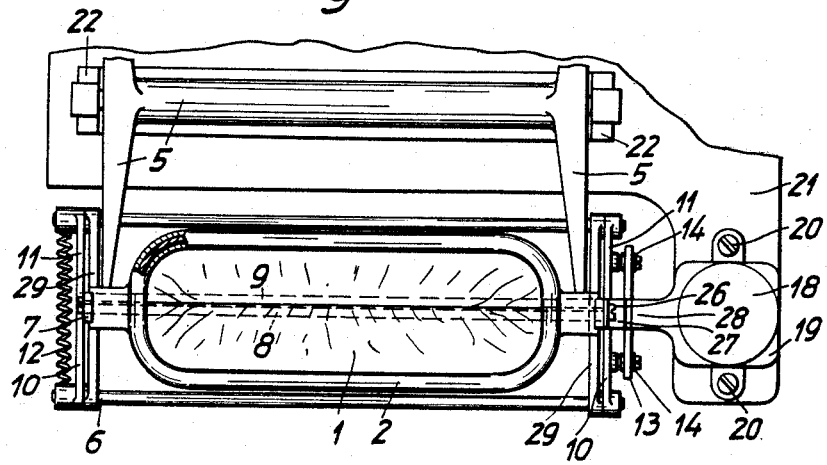

United States Patent Office

2,963,258
Patented Dec. 6, 1960

2,963,258

WEIGHING CONTAINER, PARTICULARLY FOR AUTOMATIC SCALES

Adolf Stambera, Stuttgart-Bad Cannstatt, Germany, assignor to Firma Fr. Hesser Maschinenfabrik-Aktiengesellschaft, Stuttgart-Bad Cannstatt, Germany, a corporation of Germany Filed July 24, 1956, Ser. No. 599,740

Claims priority, application Germany Aug. 1, 1955

5 Claims. (Cl. 249—16)

The present invention relates to a weighing scale for pulverulent materials. More particularly, it relates to a container for receiving a predetermined weight of said material and a flexible vertically elongated laterally collapsible sleeve for completely discharging said material from said sleeve, either automatically or semi-automatically after each weighing operation.

Where a rapid and accurate weighing is to be made with an automatic or semi-automatic scale, the container or pan for the material to be weighed must be so arranged that there is a rapid and complete emptying of the pan after termination of each weighing operation. To this end, such pans have hitherto either been provided with one or two downwardly-opening flaps, or the pans have been made in two parts and of such construction that, when the pan is opened the two halves thereof pivot outwardly and thereby release the weighed material. In addition to the drawback that such pans are comparatively heavy and thus contribute a substantial amount of inertia to the balance system of the scale, it has been found that many pulverulent materials weighed in automatic scales, such as for example baking products, soap powder, and the like, adhere to the inner walls of the pan and form bridges, so that the charged material is inaccurately weighed.

It is an object of the invention to remove these drawbacks and to provide a weighing container which is of light weight, and which ensures that the container is completely emptied after each weighing operation, even when weighing materials which tend to stick or cake together.

To this end, the weighing container according to the invention comprises an open ended sleeve or tube formed of flexible material, such as smooth-fiber textiles or fabrics and foils of synthetic materials such as polyethylene, polyvinyl or the like, the open ended tube being suspended from the weighing member of the scale. The lower end of the tube can be closed at will by means of a suitable mechanism, for example a clamping device, which presses the sleeve flat.

Preferably the sleeve is tapered downwards so that the width of the lower end, when flattened, is approximately equal to the width of the upper and open portion of the sleeve.

In accordance with a further feature of the invention, the sleeve and a holder therefor on the weight responsive member are so constructed that the sleeve is readily replaceable, thus enabling the most suitable sleeve to be used for any particular filling material and for any desured weight of charge, the weighed material being effectively non-adherent to the sleeve material.

The weighing sleeve according to the invention is not only substantially lighter than the weighing pans which have hitherto been used, but is rapidly self-emptying by gravity without an adhesive residue being left behind. This last-mentioned advantage is obtained, firstly, by reason of the fact that the material to be weighed, which can otherwise only be handled with difficulty, will adhere to appropriately surfaced synthetic materials used in the weighing container at most only to an insignificant extent and, secondly, because there is a sudden distending of the sleeve when the clamping or closure device is released, so that any adhering residues of the material are shaken free from the walls of the sleeve which are completely smooth and approximately vertical in the opened condition.

The weighing container according to the invention is, in addition, completely inert to the material being weighed and, moreover, can very readily be cleaned, which is of great advantage particularly where food products or the like are to be weighed. For this purpose it is merely necessary to remove the sleeve from its holder, and it can then be cleaned without difficulty by washing or in similar fashion.

An embodiment of the invention is illustrated by way of example in the accompanying drawings, wherein:

Fig. 3 is a top plan view of the weighing container;

Fig. 4 is a front view of the container;

Figure 1:
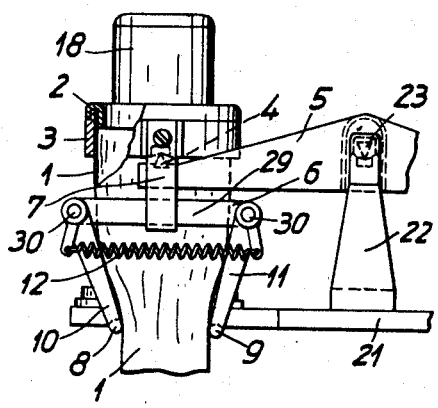
Fig. 1 is a side view of the weighing container with the closing mechanism shown in the opened condition.

In the present embodiment the weighing container 1 is made of suitable synthetic or natural sheet material in the form of a tubular sleeve which is preferably somewhat narrowed at its lower part, and is clamped at its upper end between a downturned flange 2 and a frame 3 mounted on the weigh beams of the scale of which only a portion is shown in the drawing. The sleeve 1 may be secured to the flange 2 in any suitable fashion and, for example, may be adhered, vulcanized, or even stitched thereto. Instead of using this flange, some other suitable arrangement of known type may be provided to enable the container 1 to be detachably fastened to the frame 3. Thus, a fastening collar or the like may replace the flange, this surrounding the frame 3 and thereby clamping the tube 1 to this frame.

The frame 3, which is preferably of rectangular form and provided with rounded corners, is mounted on the weigh beam 5 by means of knife edges 4. Located beneath the frame 3 is the closing mechanism which comprises a further frame 6, secured to the upper frame 3 by means of two depending connecting members 7. This lower frame 6 serves to carry a releasable clamping device comprising two parallel clamping bars 8 and 9 which are fastened by respective pairs of lever arms 10 and 11 for pivotal movement with respect to the lower frame 6 and which are biased by a tension spring 12 connected between adjacent ones of the lever arms 10 and 11 at one side of the frame. The frame 6 comprises two end bars 29 connected to the connecting members 7 and having two revoluble shafts 30 journaled therein, shafts 30 having the pairs of lever arms 10 and 11 rigidly secured to their ends and being rotatable by angular displacement of these arms.

Figure 2:
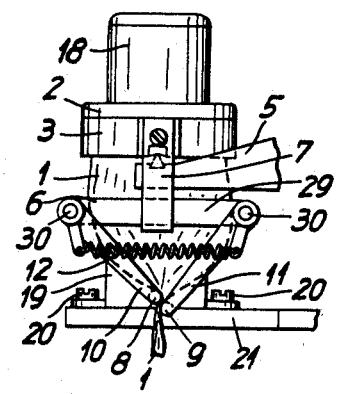
Fig. 2 is a view similar to Fig. 1 with the closing mechanism in the closed condition.
Figure 5:
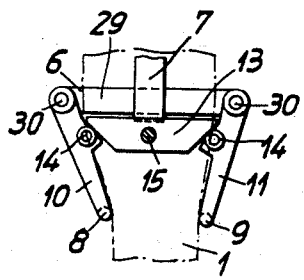
Fig. 5 shows the wedge-actuated closing mechanism in the position corresponding to the opening of the sleeve.

The clamping device is normally held thus closed by the pull of the tension spring 12, thereby clamping the sleeve 1 at its lower end. To reduce the closing pressure required to be applied to the clamping bars 8, the lever arms 10 of one clamping bar 8 are made somewhat shorter than the arms 11 of the bar 9, so that one of the two clamping bars 8 overlies the other in the closed condition (Fig. 2) as a result of which the zone of clamping action of the sleeve 1 is somewhat displaced from a vertical plane passing through the centre of gravity of the container and its contents, i.e., the line of contact between the clamping bars is offset laterally relative to the center of gravity of the material within the container. This arrangement has the advantage that the tension exerted by the spring 12 can be reduced and consequently the pressure required to open the clamping bars can be kept smaller.

Means separate from the closing mechanism are provided for opening the clamping bars 8, 9, these including a vertically movable opening wedge 13 mounted on the free end of a lever arm 15. The lever arm 15 is actuated by an electromagnet 16 of the solenoid type, the plunger 31 of which is pivotally connected to the lever arm 15. The solenoid 16 is disposed within a housing 18 and is supported on a bearing block 19 which, in turn, is fastened to a base plate 21 by means of two screws 20. The pedestals 22 for the fulcrum knife edges 23 of the weigh beam 5 are also mounted on the base plate 21. The opening wedge 13 is restored to its starting position by a retractile spring 24 connected to the lever arm 15 and anchored to the bearing block 19 by means of a screw 25.

When, during a particular weighing operation, a certain predetermined weight of pulverulent material in the container (1) is reached, the electromagnet 16 is energized in known fashion, either manually or automatically. The resultant downward movement of the solenoid plunger 31 pivots the arm 15 against the action of the spring 24 and thereby forces the opening wedge 13 between the rollers 14 provided on the lever arms 10 and 11, so that these arms are pushed outwardly away from each other downwards and the container 1 is thereby opened.

Figure 6:
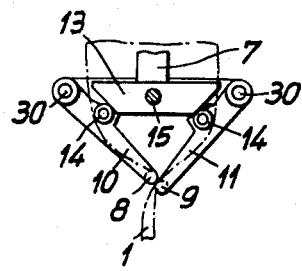
Fig. 6 is a view similar to Fig. 5 with the closing mechanism closed.

When the solenoid 16 is deenergized, the wedge 13 is lifted clear of the rollers 14 by the retractile spring 24 so that there is no interference with weight responsive movement of the scale beam 5. The clamping bars 8 are brought to the closed position shown in Fig. 6 by the tension spring 12. During the operation downward movement of the wedge 13 an abutment, consisting of an angle iron 27 secured to the container-supporting frame 3 by means of a screw 26, is carried downward with the weighing container until it abuts a tongue or stop 28 mounted on the bearing block 19 of the electromagnet 16, thereby to limit movement of the container 1 and the knife edges 4 supported on the scale beam 5.

The form and method of suspension of the weighing container in accordance with the invention are, of course, not limited to those illustrated and described in this specific example, but may take other forms more suitable to the conditions met with in particular instances.

The material chosen for the sleeve-form weighing container depends primarily on the nature of the particular bulk material which is to be weighed and will advantageously be chosen in each case after simple practical tests (which may be confined mainly to ascertaining the tendency toward adhesion of the bulk pulverulent material to the container material) from the many known textiles, foils of synthetic materials or the like.

Various changes and modifications may be made without departing from the spirit and scope of the present invention as defined in the claims.

What I claim is:
1. In a weighing scale having a pivotally supported weigh beam, a container supported on said weigh beam for receiving material to be weighed, said container consisting of a flexible tubular sleeve which is open at both ends, and selectively operable means adapted to engage the lower end of said sleeve and press the same flat for closing the latter.

2. A weighing scale having, in combination, a pivotally supported weigh beam, a frame supported on said weigh beam, a flexible tubular sleeve which is open at both ends and suspended from its upper end by said frame for receiving material to be weighed, means adapted to press the lower end of said sleeve flat for closing the latter, and means operatively connected with said pressing means for opening the latter after receipt of a predetermined weight of material in said sleeve.

3. A weighing scale as defined in claim 2, wherein said tubular sleeve is vertically elongated and the lower part of said tubular sleeve is of reduced width relative to its upper part, the width of the lower part of said sleeve when flattened being substantially equal to the width of the open upper end of said sleeve.

4. A weighing scale comprising, in combination, a pivotally supported weigh beam, an open frame mounted on said weigh beam, a collar detachably connected to said frame, a flexible tubular sleeve which is open at both ends and which is adapted to receive material to be weighed, said sleeve being secured at its upper end between said frame and said collar, means adapted to press the lower end of said sleeve flat for closing the latter, and means operatively connected with said pressing means for opening the latter after receipt of a predetermined weight of material in said sleeve.

5. In a weighing scale, the provision of a movable weighing member for supporting a load to be weighed, a frame carried by said weighing member, a vertically elongated sleeve depending from said frame, said sleeve being open at its lower end and being adapted to receive pulverulent material to be weighed at its upper end, said sleeve being formed of flexible sheet material to which said material to be weighed is effectively non-adherent, and selectively controllable closure means engageable with the lower end portion of said sleeve for flattening and releasing said lower end at will, whereby said material may be retained in said sleeve for weighing or discharged by gravity therefrom after it has been weighed.

References Cited in the file of this patent

UNITED STATES PATENTS

| | | |
|---|---|---|
| 987,517 | Welsh | Mar. 21, 1911 |
| 1,477,227 | Weister | Dec. 11, 1923 |
| 1,495,724 | Blake | May 27, 1924 |
| 1,872,047 | Templin | Aug. 12, 1932 |
| 2,588,567 | Perlman | Mar. 11, 1952 |
| 2,607,513 | Lawson | Aug. 19, 1952 |
| 2,681,751 | Stone | June 22, 1954 |